March 31, 1970  Z. J. ZAHARSKI  3,504,070
VACUUM FORMING METHOD AND APPARATUS
Filed Feb. 19, 1968
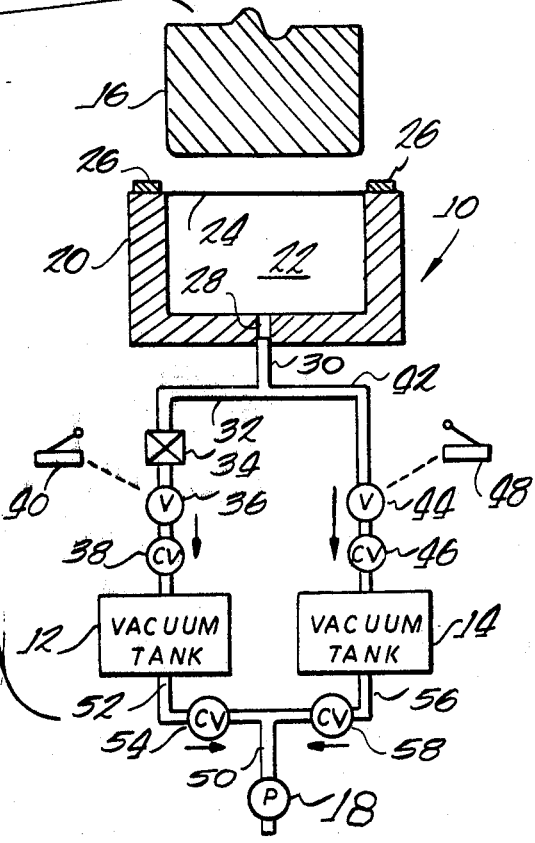
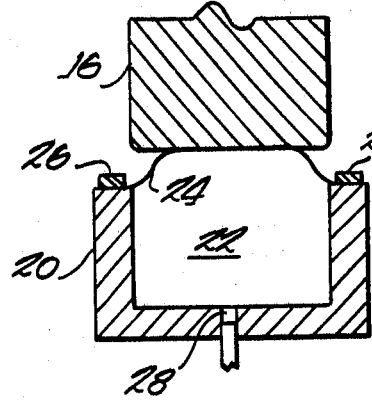
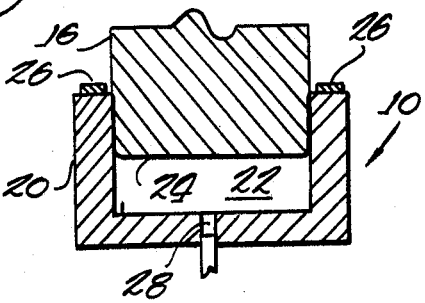
Inventor
Zigmund J. Zaharski
by Fidler, Bradley, Patnaude
Atty's United States Patent Office 3,504,070
Patented Mar. 31, 1970

3,504,070
VACUUM FORMING METHOD AND APPARATUS
Zigmund J. Zaharski, Chicago, Ill., assignor to Comet Industries, Inc., Bensenville, Ill., a corporation of Illinois
Filed Feb. 19, 1968, Ser. No. 706,559
Int. Cl. B29c 17/04
U.S. Cl. 264—89          12 Claims

ABSTRACT OF THE DISCLOSURE

As the male die presses the heated plastic sheet into the female die, a vacuum is applied to the internal cavity of the female die from a first vacuum chamber communicating therewith and, when the plastic sheet is close to the shaping surface of the female die, a vacuum is applied to the internal cavity of the female die from a second vacuum chamber. Both vacuum chambers are evacuated by a single pump.

---

This invention relates to vacuum forming and more particularly relates to a method and apparatus for applying the vacuum to the mold cavity during vacuum forming.

To vacuum form an article, a plastic sheet is rigidly mounted around the rim of a female die and is heated until it is soft. The male die is then moved downwardly into the cavity of the female die and at the same time air is evacuated from the female die. As the male die moves further into the female die with the sheet member, the vacuum pulls the plastic sheet against the shaping surfaces of the female die to shape it. The male die is then removed from the cavity and, when the molded product is sufficiently cool, it is ejected.

While the plastic sheet is being moved into the female die by the male die, the pressure applied to the plastic sheet by the vacuum is low. A low pressure is used at this time because, if the pressure is large, the plastic sheet stretches and thins at places where the pressure is the greatest. This uneven thinning causes the final product to be susceptible to cracking or splitting at the thinner portions.

Near the end of the stretching operation, after the plastic sheet has been brought close to the shaping surfaces of the female die, a lower vacuum pressure is applied to the cavity in the female die. This lower pressure increases the pressure on the soft plastic sheet pulling it against the shaping surfaces to form the sheet with precision.

One type of prior art vacuum forming apparatus withdraws air from the female die cavity with a single vacuum pump and a single vacuum tank to provide both the lower pressure on the sheet as the male die enters the female die and the higher pressure on the sheet to tightly draw the plastic sheet against the shaping on the sheet to tightly draw the plastic sheet against the shaping surfaces. Either of two different arrangements of the vacuum pump and the vacuum tank are used in this type of prior art vacuum forming apparatus.

In one of the two arrangements of this type of prior art vacuum forming apparatus, the vacuum tank is coupled to the vacuum outlet in the cavity of the female die through two parallel vacuum lines. One of the two parallel vacuum lines includes a reducing valve. As the male die enters the remale die, air is evacuated into the vacuum tank through the vacuum line having the reducing valve. To draw the plastic sheet tightly against the shaping surfaces, the vacuum outlet from the female die cavity is coupled to the vacuum tank directly through the vacuum line that does not have the reducing valve so that a higher pressure is exerted on the plastic sheet. The single pump continuously evacuates air from the vacuum tank.

This arrangement of the prior vacuum forming apparatus has the disadvantage that the vacuum tank must be relatively large and the vacuum pump must have a high capacity. The vacuum tank must be large because it receives air from the female die during the first part of the vacuum forming operation through the reducing valve, and after receiving this air, must apply a high vacuum pressure to the female die through a direct line. Since the pressure within the vacuum tank has already been reduced by the air that was removed from the cavity of the female die during the time the male die was entering the cavity, the tank must have a large capacity so that it will still be able to apply the high pressure even though its vacuum has been reduced. The pump must have a large capacity so that it can maintain the high vacuum in the large vacuum tank. This disadvantage is especially significant in large capacity vacuum forming because a large amount of air enters the vacuum tank as the male die enters the female die in these large capacity vacuum forming operations.

In the second arrangement of the prior art vacuum forming apparatus the vacuum pump communicates with a vacuum line that interconnects the cavity in the female die to the vacuum tank. This vacuum line has shutoff valves on either side of the pump, so that the pump is connected to the vacuum forming apparatus in any of three manners, which are: (1) with the pump communicating only with the female die; (2) with the pump communicating simultaneously with both the vacuum tank and the female die; or (3) with the pump communicating only with the vacuum tank.

With this arrangement, air from the female die is drawn both into the vacuum tank and through the vacuum pump as the male die enters the female die. When it is time to apply a higher pressure to draw the plastic sheet tightly against the shaping surfaces of the female die, the vacuum tank is shut off by means of the valve in the vacuum line between the pump and the vacuum tank. The pump now draws air through the vacuum line from the small remaining space between the shaping surfaces of the female die and the plastic sheet. Since this volume is relatively small, the pump exerts an increased pressure above the pressure that was applied simultaneously from the vacuum tank and the pump acting together on the larger volume of air when the male die was entering the female die.

This arrangement of the prior art vacuum forming apparatus also has a disadvantage of requiring a large capacity vacuum pump. The capacity of the vacuum pump must be large because it alone must apply the high pressure to the plastic sheet when the plastic sheet is being tightly drawn against the shaping surfaces. Moreover, it must evacuate the vacuum chamber in a short time, which period of time is between the time that it is no longer necessary to exert the high pressure against the plastic sheet and the time that a new cycle is started with the plastic sheet being pulled into the female die. Because this period of time is short, the pump must be large enough to quickly evacuate the vacuum chamber so that sufficient air is exhausted from the cavity of the female die during the first part of the vacuum forming cycle.

Accordingly, it is an object of this invention to provide an improved vacuum forming method and apparatus.

It is a further object of this invention to provide an improved method and apparatus for applying vacuum pressure to a plastic sheet during a vacuum forming operation.

It is a still further operation of this invention to provide a vacuum forming method and apparatus that does not require a large capacity pump.

It is a still further object of this invention to provide a vacuum forming method and apparatus which may incorporate within itself a small capacity pump and still provide a low pressure against a plastic sheet during an initial portion of the vacuum forming cycle and provide a high pressure against the plastic sheet during a later portion of the vacuum forming cycle.

In accordance with the above and further objects of the invention a vacuum forming apparatus is provided in which the female die cavity communicates through parallel vacuum lines with two different vacuum tanks. A single vacuum pump communicates with each of the vacuum tanks and evacuates both of these tanks. A different solenoid operated valve opens and closes each of the two vacuum lines leading between the female die and the two vacuum tanks. Also, a different one of two adjustable check valves is in each of the two parallel vacuum lines communicating with the two vacuum tanks and the vacuum pump. The solenoid operated valves are controlled from limit switches which are activated by the male die as it enters the female die.

In operation, a male die actuates a first of the two limit switches as it depresses the heated plastic sheet into the female die. This first limit switch causes a first of the two solenoid operated valves to open and connect the female die to a first of the two vacuum tanks through one of the parallel vacuum lines. This first vacuum tank exerts a pressure within the female die to slowly exhaust the air as the male die moves into the female die. When the male die reaches a predetermined depth, it actuates a second of the limit switches. This second limit switch opens the second of the two solenoid operated valves in the second branch of the vacuum line to connect the female die to the second vacuum tank, which is evacuated to a lower pressure than the first vacuum tank. The pressure from the second vacuum tank draws the plastic sheet firmly around the shaping surfaces of the female die. The shaped plastic sheet is ejected after it has hardened.

The single pump evacuates air from the two vacuum tanks through two adjustable check valves that have the size of their valve openings adjusted to permit the pump to draw air from the tanks at the proper pressure for each tank. The valve opening of the first adjustable check valve is small so that the pump evacuates the first vacuum tank to a pressure suitable for the first portion of the vacuum forming cycle during which portion the male die is moving into the female die. The valve opening of the second adjustable check valve is larger so that the pump evacuates the second vacuum tank to a lower pressure than the first vacuum tank. Because the pressure in the second vacuum tank is lower, it will impose a higher pressure on the plastic sheet, which pressure is suitable for drawing the plastic sheet more tightly around the shaping surfaces of the female die.

The above noted and other features of the invention will be understood more fully from the following detailed description when considered with reference to the accompanying drawings in which:

FIGURE 1 is a diagrammatic view of the vacuum forming apparatus during a first portion of a cycle of operation;

FIGURE 2 is a diagrammatic view of a mold that is a portion of the vacuum forming apparatus, shown during a second portion of a cycle of operation; and FIGURE 3 is a diagrammatic view of the mold during a third portion of a cycle of operation.

STRUCTURE OF THE VACUUM FORMING APPARATUS

In FIGURE 1 a diagrammatic view of the vacuum forming apparatus is shown having a mold 10, a first vacuum tank 12, a second vacuum tank 14, and a vacuum pump 18.

The mold includes a movable male die 16 and a female die 20 having an internal cavity 22 opening upwardly towards the movable male die 16. A sheet of plastic 24 is positioned over the cavity 22 of the female die 20 between the cavity 22 and the male die 16 and is held in place by a clamping frame 26 to substantially close and seal the cavity 22 from the atmosphere. An outlet 28 in the bottom of the female die 20 communicates at its upper end wtih the cavity 22 and at its lower end with the vacuum line 30.

The first vacuum tank 12 communicates with the vacuum line 30 through a first branch vacuum line 32 and a series of three valves spaced along the first branch vacuum line 32 between the vacuum line 30 and the first vacuum tank 12, which valves are: (1) an air release valve 34, (2) a solenoid-operated valve 36, and (3) a check valve 38 in that order from the branch line 32. The check valve 38 is connected to permit air to be drawn into the vacuum tank 12 from the female die and to prevent air from escaping from the vacuum tank 12 into the vacuum line 30. The solenoid-operated valve 36 is controlled by the limit switch 40, which engages a portion of the male die 16 when the male die is at a predetermined location within the female die cavity 22. The limit switch 40 opens the solenoid-operated valve 36 when it is engaged by the male die 16.

The vacuum tank 14 communicates with the vacuum line 30 through a second branch vacuum line 42 and a series of two valves spaced along the second branch vacuum line 42 between the vacuum line 30 and the second vacuum tank 14, which valves are: (1) a solenoid-operated valve 44 and (2) a check valve 46 in that order from the branch vacuum line 42. The check valve 46 is connected to permit air to be drawn into the second vacuum tank 14 from the vacuum line 30 and to prevent air from escaping from the second vacuum tank 14 into the vacuum line 30. A limit switch 48 engages a portion of the male die 16 when the male die 16 is at a predetermined location within the female die cavity 22. When the limit switch 48 is engaged by the male die 16, it opens the solenoid-operated valve 44 and closes the solenoid-operated valve 36.

The vacuum pump 18 draws air from the vacuum tank 12 and the vacuum tank 14 through the vacuum line 50. The vacuum line 50 communicates with the first vacuum tank through the branch vacuum line 52 and with the second vacuum tank 14 through the branch vacuum line 56. The branch line 52 communicates with the adjustable check valve 54 which is arranged to prevent air from flowing back into the vacuum tank 14 and the vacuum line 56 communicates with the adjustable check valve 58, which also is arranged to prevent the flow of air back to the vacuum tank 14. The adjustable check valve 54 is adjusted to have a smaller valve opening than the adjustable check valve 58.

OPERATION

As shown in FIGURE 1, a sheet of thermoplastic material is clamped over the vacuum cavity 22 of the female die 20 by means of a clamping frame 26. The sheet of thermoplastic material is heated by radiant heaters (not shown) until it is soft and stretchable. After the sheet of thermoplastic material 24 has been softened by the heat, air is forced into the mold cavity 22 through the outlet 28 and forces the thermoplastic sheet upward against the male die 16 as shown in FIGURE 2.

After the sheet of plastic 24 has been stretched upwardly against the male die 16, the male die is moved downward into the vacuum cavity 22 and carries the sheet of plastic 24 with it as shown in FIGURE 3. As the male die and the sheet of plastic 24 start downward, a portion of the male die 16 contacts the limit switch 40 closing a circuit through the solenoid-operated valve 36. When the circuit through the solenoid-operated valve 36 has been closed, this valve opens and air is exhausted from the cavity 22 through the outlet 28, the vacuum line 30, the first branch vacuum line 32, and the valves 34, 36, and 38 into the vacuum tank 12. The air is exhausted from the mold cavity 22 as the die 16 and the sheet of plastic 34 move downwardly.

When the die 16 and the sheet of plastic 24 have penetrated to a predetermined depth within the female die 20, the limit switch 48 is activated, opening the circuit to the solenoid 36 and closing a circuit to the solenoid of the solenoid-operated valve 44. This causes the solenoid operated valve 36 to close sealing the vacuum tank 12 from the cavity 22 and at the same time causes the solenoid-operated valve 44 to open enabling the cavity 22 to communicate with the vacuum tank 14.

The vacuum tank 14 is at a lower absolute pressure than the vacuum tank 12 was before the valve 36 was open and therefore increases the pressure on the sheet 24. This pressure causes the sheet 24 to tightly engage the shaping surfaces of the female die 20 within the cavity 22. The male die 16 is then withdrawn from the cavity 22 and the limit switch 48 opens causing the valve 44 to close. After the sheet 24 has hardened, it is ejected.

The pump 18 continuously withdraws air from the vacuum tank 12 and the vacuum tank 14 in parallel. The adjustable check valves 54 and 58 are adjusted so that air is withdrawn by the pump 18 at a faster rate from the vacuum tank 14 than from the vacuum tank 12. This causes the vacuum tank 14 to be at a lower absolute pressure than the vacuum tank 14.

Because the pressure in the vacuum tank 12 is higher than the pressure in the vacuum tank 14, the pressure on the sheet 24 as it is moving within the cavity 22 is slight and does not cause excessive localized thinning of the plastic sheet 24. On the other hand, the pressure exerted on the sheet 24 when the low pressure within the vacuum tank 14 is applied to the cavity 22, causes the sheet 24 to tightly engage the shaping surfaces of the female die 20 within the cavity 22 enabling the sheet to be formed with precision.

The pump 18 withdraws air continuously from both vacuum tanks 12 and 14 in parallel, but it draws more air at times from one vacuum tank than from the other. The ratio of the volumes of air drawn by the vacuum pump 18 is determined by three different circumstances.

Firstly, the adjustment of the adjustable check valves 54 and 58 maintains a fixed ratio whenever both vacuum tanks are at a low pressure such as at the beginning of a vacuum forming cycle when both solenoid-operated valves 36 and 44 are closed. Secondly, when the first vacuum tank 12 communicates with the female die cavity 22, its pressure rises and causes more air to be withdrawn from it by the pump 18. Thirdly, when the second vacuum tank 14 communicates with the cavity 22 to draw the plastic sheet 24 tightly around the shaping surfaces within the female die, the air pressure within it increases so that the pump 18 draws more heavily from it.

Since the pump 18 draws continually from each tank, it has a period of time equal to the time it takes for the vacuum forming apparatus to complete a cycle of operation to restore each vacuum tank to the proper pressure. Moreover, it draws most heavily from the tank most in need of being exhausted since that tank will have a high internal pressure and will communicate with the pump through a check valve that automatically corrects the rate of pumping in accordance with the required final internal pressure.

The use of two vacuum tanks rather than one vacuum tank enables a smaller capacity vacuum pump 18 to be utilized to evacuate the vacuum tanks. Since the capacity of the pump 18 is low, it is inexpensive so that a separate pump may be economically incorporated with each vacuum forming apparatus rather than having several apparatus share a pump by operating at different times.

Although a specific embodiment of the invention has been described, many modifications and variations of the invention are possible in the light of the above teachings. It is therefore to be understood that, within the scope of the appended claims, the invention may be practiced otherwise than as specifically described.

What is claimed is:

1. A method of vacuum forming, comprising the steps of:
    mounting a sheet of plastic over a die cavity;
    softening the sheet of plastic;
    connecting the die cavity with a first source of pressure lower than atmospheric pressure to evacuate air from the cavity as the sheet of plastic is forced downward into the cavity;
    connecting the die cavity to a source of pressure lower than said first source of pressure after the sheet of plastic has penetrated substantially all the way into the die cavity; and
    withdrawing air from the first and second sources of low pressure through a single pump.

2. The method of claim 1 further including the step of forcing the softened sheet of plastic downwardly into the die cavity by a male die.

3. The method of claim 2 in which the step of connecting the die cavity to a first source of low pressure comprises the step of connecting the die cavity to a first source of low pressure at a time when the male die is close to the entrance of the cavity and in which the step of connecting the die cavity to a second source of pressure lower than said first source of pressure comprises the step of connecting the die cavity to a second source of pressure lower than said first source of pressure after the male die has penetrated to a substantial depth within the cavity.

4. The method of claim 3 further including the step of applying pressure within the die cavity to force the softened sheet of plastic upwardly against the male die prior to moving the male die within the cavity.

5. Vacuum forming apparatus, comprising:
    a mold having a cavity for receiving a sheet of moldable material;
    a first vacuum tank;
    a second vacuum tank;
    connecting means for providing communication between the interior of the first vacuum tank and the mold cavity during a first portion of a vacuum forming cycle and for providing communication between the interior of the second vacuum tank and the mold cavity during a second portion of the vacuum forming cycle;
    a pump; and
    means for providing communication between the pump and the interior of the first and second vacuum tanks whereby the vacuum pump exhausts both the first and second vacuum tanks.

6. The apparatus of claim 5 in which said means for providing communication between the pump and the first and second vacuum tanks comprises regulating means for regulating the evacuation of said first and second vacuum tanks such that said second vacuum tank is evacuated to a pressure which is a predetermined fraction of the pressure in said first vacuum tank.

7. The apparatus of claim 6 in which said regulating means includes a first adjustable check valve having its inlet communicating with the interior of the first vacuum tank and its outlet communicating with the vacuum pump and a second adjustable check valve having its inlet communicating with the interior of the second vacuum tank and its outlet communicating with the vacuum pump.

8. The apparatus of claim 5 in which said connecting means includes a limit switch and a solenoid-operated valve with the outlet of said solenoid-operated valve communicating with the interior of the first vacuum tank and the inlet of the solenoid-operated valve communicating with said cavity, said vacuum forming apparatus further including a male die movably mounted in line with said mold cavity and having a portion in line with said limit switch, whereby said limit switch is activated by the movement of said male die.

9. The apparatus of claim 8 in which said limit switch is engaged by a portion of said movable male die when said movable male die begins moving downwardly into said cavity.

10. The apparatus of claim 9 in which said connecting means includes a second solenoid-operated valve and a second limit switch, the limit switch being positioned so that a portion of said movable die engages said limit switch when said die has penetrated the cavity to a predetermined depth, and means connected to said limit switch for causing said second solenoid-operated valve to open and said first-mentioned solenoid-operated valve to close.

11. The apparatus of claim 10 in which said connecting means includes a first adjustable check valve having its inlet communicating with the interior of said first vacuum tank and its outlet communicating with said pump and a second adjustable check valve having its inlet communicating with the interior of the second vacuum tank and its outlet communicating with the inlet to said pump, said second check valve adjusted to permit said second vacuum tank to be evacuated to a lower pressure than said first vacuum tank.

12. The apparatus of claim 11 in which check valves are positioned between said first and second solenoid-operated valves and said first and second vacuum tanks to prevent the flow of air from said vacuum tank back into said cavity.

References Cited

UNITED STATES PATENTS 2,123,552   7/1938   Helwig.

FOREIGN PATENTS 781,979   8/1957   Great Britain.
786,416   11/1957   Great Britain.

WILLIAM J. STEPHENSON, Primary Examiner

U.S. Cl. X.R.

18—19